Oct. 11, 1932.  S. W. BORDEN  1,882,113
EARTH ELECTRODE METER
Filed June 21, 1930
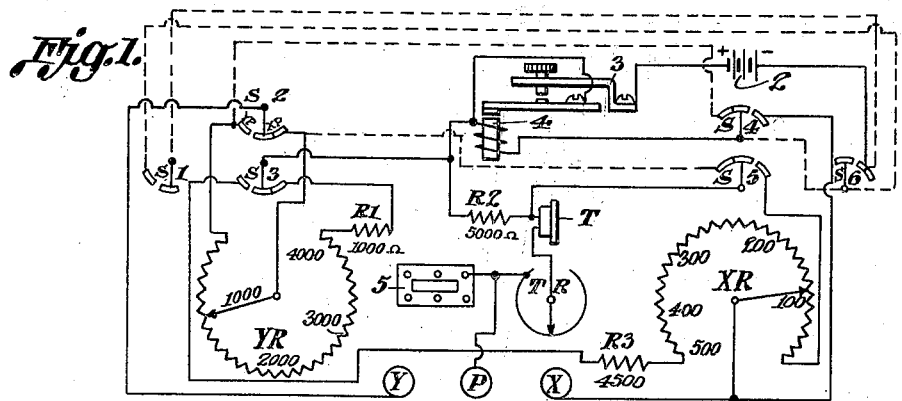
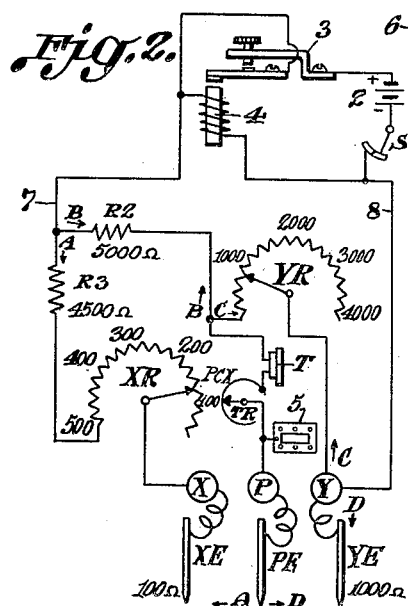
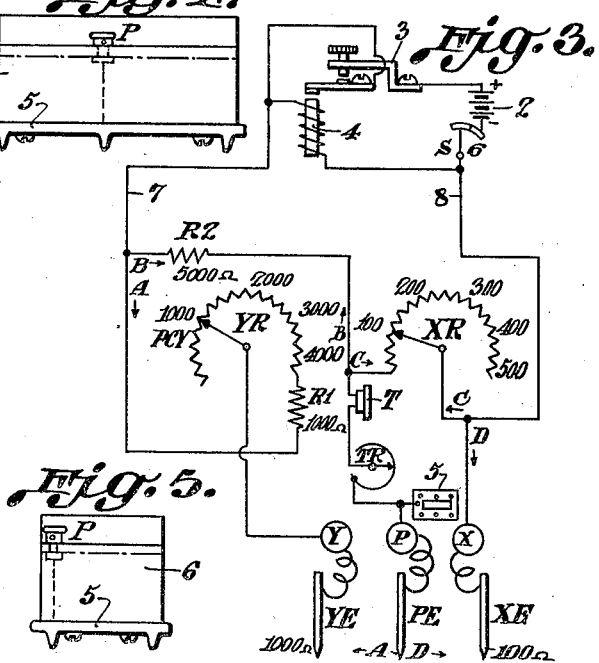
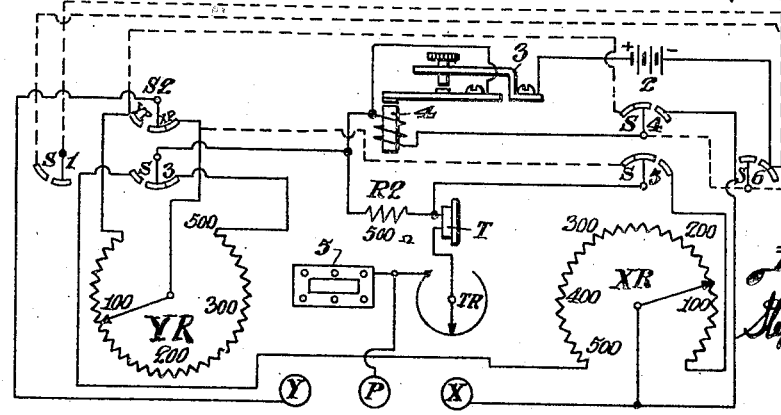
Inventor
Stephen W. Borden Patented Oct. 11, 1932

1,882,113

UNITED STATES PATENT OFFICE

STEPHEN W. BORDEN, OF SUMMIT, NEW JERSEY

EARTH ELECTRODE METER

Application filed June 21, 1930. Serial No. 462,878.

This invention pertains to electrical meters for measuring the resistance of earth electrodes, and is of the nature of a modified Wheatstone bridge. Such meters are known as "groundometers" and will be referred to as such hereinafter. Meters of this class are described in my copending applications, Serial Nos. 347,780 and 382,753 and also in U. S. Patent No. 1,744,566.

The particular type of meter covered by this invention is the type in which the resistance of one of the reference electrodes is included in and utilized as a part of the total resistance of one of the bridge arms, said electrode not being included in the same bridge arm with the electrode proper, the resistance of which is to be measured. It is therefore of the same general class as the meter described in U. S. Patent No. 1,744,566, Everett V. Mott, et al. In the Mott bridge, the reading obtained is only approximate, the magnitude of the error depending upon the resistance of the electrodes A or B, Fig. 2 of the Mott patent.

One object of the invention is to provide such bridge elements and such an arrangement of these elements that no error will be introduced into the readings by reason of the inclusion of the reference electrode in one of the arms of the bridge. Another object is to provide a meter usable with very high resistance reference electrodes. Another object is to provide a meter having a built-in probe electrode.

Referring to the drawing, all of which is schematic. Fig. 1 shows the various elements composing the groundometer and the circuit arrangements when the switch is in the "off" position; Fig. 2 shows the circuit arrangement of the elements in use when the switch is thrown to the YP position; Fig. 3 shows the circuit arrangement of the elements in use when the switch is thrown to the XP position. Fig. 4 is a front elevation of an assembled meter, in part, showing the electrode 5 on the bottom of the meter case 6. Fig. 5 is an end elevation of the same. Fig. 6 is a modified form corresponding to Fig. 1.

Referring to Fig. 1; 2 is a battery, 3 an interrupter and 4 a magnet, and these three elements constitute the source of power for the bridge. 5 is a metal plate or knob on the bottom of the meter casing. YR, XR and TR, are rheostats or other variable resistances. R1, R2 and R3 are fixed resistances. T is a telephone receiver or other suitable current detecting device.

The switching members S1, S2, S3, S4, S5 and S6, are all combined in a unitary double throw cam switch or key such as generally used in telephone work. When the switch handle is in the central position the battery circuit is open. When thrown to the YP position it establishes the connections shown in Fig. 2, and when thrown to the XP position it establishes the connections as shown in Fig. 3. The binding posts Y, P and X, are of the conventional type and are used for attaching leads which in turn are connected to the electrodes XE, PE and YE, of Figs. 2 and 3.

The rheostat TR is utilized to modify the volume of current flowing through the detector T for the purpose of preventing too loud a noise, or to protect the windings of the detector device.

While not shown in the drawing, it is to be understood that the rheostats XR and YR are provided with scales and pointers indicating the position of the contact arm on the rheostat.

The power supply for the bridge, which includes the elements 2, 3, and 4, is no part of this invention, this particular arrangement being part of the subject matter of my application 382,753. For the purposes of this present invention, any suitable source of power may be used with the bridge it being only necessary that the detector T be suitable for the type of power used. The detector T may be a telephone, a galvanometer, or any other suitable device for detecting zero current.

For the particular meter shown, the rheostat YR contains a total of 4,000 ohms, the rheostat XR 500 ohms and the rheostat TR 5,000 ohms. The fixed resistances R1, R2 and R3 contain 1,000, 5,000 and 4,500 ohms respectively.

The exact values of the fixed resistances and of the rheostats illustrated are given in order that the theory of the meter may be more readily understood, and while there must necessarily be a certain definite relation between the three fixed resistances R1, R2 and R3, and the resistances of the rheostats YR and XR, the exact values for these resistances may vary over a considerable range, the most desirable values for any particular instrument depending upon the range of the resistance of the earth electrodes which it is desired to measure with it.

Whenever the resistance of the electrode XE, PE or YE is referred to, it is to be understood to mean the resistance offered to the flow of current from the electrode into the surrounding earth generally. While the actual measurement includes also the contact resistance between electrodes YE and XE and the earth, and also the resistance of the leads connecting these electrodes with the binding posts, these resistances are generally considered as a part of the resistance of the electrodes and are usually of such small value as to be negligible. When desirable the resistance of the leads may be measured and allowed for.

Referring to Fig. 2, XE is the electrode the resistance of which it is desired to determine. This electrode is connected to the binding post X by a portable lead. A reference electrode, YE, is inserted in the ground, preferably at a distance of not less than 25 feet from XE, and connected to the binding post Y. A third reference electrode, PE, is inserted in the ground at a distance of at least 25 feet from XE and at least 10 feet from YE, and connected to binding post P. Except where the earth is of very high resistance, the plate 5 will serve as electrode PE. The switch is thrown to the Y position resulting in the connections shown in Fig. 2.

It will be observed that as now arranged, Fig. 2, we have a bridge arrangement consisting of four arms, A, B, C and D, connected in closed series in the order mentioned. The arm A consists of the fixed resistance R—3, of 4,500 ohms, that part of rheostat XR which may be in circuit and the resistance of the earth electrode XE. Arm B consists of the fixed resistance R2 of 5,000 ohms. Arm C consists of that part of rheostat YR which may be in circuit, and arm D consists of the resistance of earth electrode YE. The source of current is connected to the bridge at the junction of arms A and B via conductor 7 and of arms C and D, via conductor 8, and the detector T is connected between the junction of arms B and C and of arms A and D. This latter junction is in the earth and at a point somewhat removed from both the electrodes XE and YE and the connection to it is made by driving an electrode, as PE, at a suitable distance from the other electrodes.

With the connections as in Fig. 2, and with the rheostat XR in any position, the rheostat YR is adjusted until a balance is obtained, when, from the well known principles of the Wheatstone bridge balance, the resistance in the rheostat YR will equal the resistance of the earth electrode YE, providing the total resistance in arm A is equal to the total resistance in arm B. The total resistance in B is 5,000 ohms and the total resistance in A is 4,500 ohms plus the resistance of the electrode XE plus a part of XR. It is assumed that the resistance of XE does not exceed 500 ohms, that being the maximum capacity of the particular meter shown. If the rheostat XR be adjusted to such a point that the resistance between zero and the point of contact of the rheostat arm PCX, is equal to the resistance of the electrode XE, then the resistance of the remaining part of the rheostat XR plus the resistance of the electrode XE will be 500 ohms, which added to the 4,500 ohms of resistance R3 will give a total resistance of 5,000 ohms for bridge arm A. The manner in which the adjustment of rheostat XR is made will be described later, but for the present purpose it is assumed that the resistance of the electrode XE is 100 ohms and that the rheostat XR has been adjusted to the 100 ohm point. If the resistance of electrode YE be 1,000 ohms then the bridge will balance when rheostat YR has been adjusted to the 1,000 ohm point.

If the bridge be balanced as in Fig. 2, but with the rheostat XR adjusted to a point which does not correspond to the resistance of XE, then a balance will be obtained when rheostat YR is adjusted to some point which does not correspond to the resistance of YE, if XR is set at 500 in place of 100 then the total resistance in arm A would be 4,500 plus 100 or a total of 4,600 ohms, while the resistance in arm B is 5,000 ohms and since for a state of balance, B is to C as A is to D, the bridge will balance when rheostat YR is adjusted to approximately 1,087 ohms. In other words, rheostat YR will be adjusted to a value 8.7% higher than the resistance of the electrode YE and, as later pointed out, this would result in an error in the measurement of electrode XE of 1.7%, when the resistance of YE is 1,000 ohms. The maximum error results when YE is a maximum or 4,000 ohms and XE is a maximum or 500 ohms and XR is set at zero, in which case the error would be 11%.

After the bridge has been balanced in the Y position, the switch is thrown to the X position resulting in the arrangement shown in Fig. 3. It is understood of course, that the rheostat YR is left in the position of balance of Fig. 2. It will be seen that the bridge now consists of four arms A, B, C and D, arranged in closed series. Arm A consists of that part of rheostat YR which is now in circuit, as a result of the adjustment made as per Fig. 2, the fixed resistance R1 of 1,000 ohms and the resistance of the electrode YE. Since however that portion of rheostat YR lying between the zero point and the point of contact PCY is approximately equal to YE the resistance of that part of YR which is left in circuit plus electrode YE must now be approximately 4,000 ohms, to which is added resistance R1, making a total of approximately 5,000 ohms in arm A. The extent to which the above values may vary from 4,000 and 5,000 ohms, and consequently the error intailed thereby, is fully explained in the preceding paragraph. Arm B contains the 5,000 ohm fixed resistance R2. Arm C contains the rheostat XR and arm D contains the resistance of the earth electrode XE, in this case 100 ohms. The bridge will now balance when the rheostat XR is so adjusted that the resistance in circuit is equal to the resistance of electrode XE, providing the resistance of YR was properly adjusted for the resistance of YE when the instrument was in the Y position.

As previously pointed out, the preliminary incorrect adjustment of rheostat YR, due to failure to compensate for the resistance of electrode XE, might result in an error of as much as 11% in the measurement of the XE resistance. It is apparent however, that when the bridge is balanced in the X position the rheostat XR will in any case, be adjusted to the approximate value of electrode XE, the maximum error being 11% of the 500 ohms of rheostat XR. If now the bridge be again thrown to the Y position, and the rheostat YR again adjusted to balance the bridge, it is obvious that the maximum error in the adjustment can be but 11% of 500 ohms, or 55 ohms, and since the total resistance of the arm A should be 5,000 ohms the adjustment of the rheostat YR will agree with the resistance of the electrode YE to within less than 1.1% and when the bridge is thrown back a second time to the X connection, the adjustment of the rheostat XY will indicate the resistance of electrode XE with an error of less than 1.1%. If still closer accuracy is required it is only necessary to repeat the adjustments alternately in positions Y and X until neither rheostat requires further adjusting, when the measurement will be exact.

In actual service it is seldom necessary to make more than the initial adjustment in the Y position or the X position. If the resistance of electrode XE exceeds about 200 ohms it is usually satisfactory to measure the resistance within 10% plus or minus. When the resistance is 200 ohms the maximum error will be but $2/5$ of 11%, or 4.4% and this error is introduced only when the resistance of electrode YE is 4,000 ohms. If the resistance of YE is 1,000 ohms, and ordinarily it is not more than that, the resulting error is but 1.1%. Since the measurement of electrode resistances within 2% plus or minus is about the extreme of accuracy required, it is apparent that few occasions arise where it is necessary to make more than the preliminary adjustment in the Y position. In any case it requires but a few seconds to repeat the adjustments.

In the practice of measuring the resistance of earth electrodes, it is necessary to provide, for each test, two reference electrodes such as PE and YE. Inasmuch as these have to be driven into the ground for each test, withdrawn and transported from one location to another, it is apparent that there is a distinct advantage in using a test meter which will permit of the use of small reference electrodes. Since the resistance of an electrode depends upon its diameter and the depth to which it is driven into the earth, other things being equal, small short electrodes necessarily result in relatively high resistance. With the type of bridge I have herein described, the resistance of the electrode YE may be as high as 4,000 ohms and in good conducting soil such a resistance may be obtained by a small electrode, such as an ordinary ten-penny nail. The resistance of electrode PE may be as high as 10,000 ohms if the detector T be of suitable design, since the resistance in series with the detector in no way effects the measurements, the only effect of high resistance in series with the detector being to decrease its sensibility. Resistance values of this order are generally obtainable by means of a suitable electrode on the bottom of the meter case thus eliminating the electrode PE.

In the Mott meter, patent 1,744,566, should the resistance of electrodes A and B, Fig. 2, be 4,000 ohms each and the resistance 24 be 4,000 ohms, the meter would register but 50% of the resistance of electrode G. When testing with a meter of the Mott type, and other meters at present available, it is generally necessary to use reference electrodes of at least $1/2''$ diameter, driven from 4 to 6 feet in the ground, and even then there is no assurance that the error resulting from the resistance of these reference electrodes will not exceed desirable limits. In some types of meters the readings are effected directly by the resistance of the probe electrode PE. In the meter described herein, exact readings may be obtained irrespective of the resistance of any of the three electrodes involved, the only limitations being those of the particular meter concerned. In the case of the meter here described, the limits are 10,000 ohms for PE, about 4,000 ohms for YE and 500 ohms for XE.

In actual manufacturing practice it is much more economical to construct the rheostat YR having a resistance value, between the two terminals, which may vary about 10% plus or minus from any selected value as for instance, 4,000 ohms. In constructing the meter, rheostats are selected at random and the exact resistance measured, and the fixed resistance R1 is calibrated to a value representing the difference between the exact resistance of the rheostat YR and the desired resistance of the bridge arm, which in this case is 5,000 ohms.

The following relationship between the various resistances must be established. XR and YR are assumed to be selected at random but to have values of 500 and 4,500 ohms respectively to within 10% plus or minus. R2=10 times XR. R1=R2 minus YR. R3=R2 minus XR. Since the resistance of YR determines the maximum resistance of electrode YE which can be used, it is desirable to have YR constitute as large a part of the total bridge arm resistance as possible. If YR is made equal to R2 then R1 is unnecessary and it is used merely to facilitate manufacture. It is also apparent that if XR be made equal to R2 then R3 may be omitted and it is used partly to facilitate manufacturing and in order to give the meter a full scale rating which will be less than R2 since the nature of the meter makes it desirable, but not necessary, that the resistance of YR and R2 be several times the resistance of XR.

Fig. 6 illustrates a proper combination of resistance values when resistances R1 and R3 are omitted. This meter will measure electrodes up to 500 ohms but the resistance of the reference electrode YE cannot exceed 500 ohms. This particular combination is suitable for measuring relatively low resistance electrodes, say of 100 ohms and less, and for such measurements will give more accurate results than a meter having the high resistance values shown in Fig. 1.

As has been pointed out, the resistance of the electrode PE may be relatively high and in fairly good soil a probe of suitable resistance may be obtained by using a metal plate, as 5 of Fig. 1, placed upon the bottom of the meter so that it rests upon, or will sink slightly into the ground when the meter is placed in the testing position. I have found that metal corners for the wooden case in which the meter is housed, or a "silent dome" at each corner, if connected to the binding post P, gives sufficient contact with the earth to serve as the PE electrode except where the soil is very dry.

What I claim is:

1. In a meter for measuring the resistance of an earth electrode; the combination of two variable resistances, two fixed resistances, a current detecting device, a source of energy and a two position switching mechanism and electrical conductors connecting together the various elements in such manner that when the switching device is in one position the elements are grouped to form a Wheatstone bridge arrangement in which a first arm includes a variable resistance as XR, a fixed resistance as R3 and a binding post for connection to the earth electrode, as XE, to be measured; a second arm includes a fixed resistance as R2; a third arm includes a variable resistance as YR and a binding post for connection to a reference earth electrode as YE, the resistance of which constitutes the fourth arm of the bridge; the source of energy being connected at the junction of the first and second arms and at the junction of the third and fourth arms and the current detector being connected between the junction of the second and third arms and a binding post for connection to a third earth electrode, as PE, for making a connection to the junction of the fourth and first arms: and when the switching device is in the alternative position the elements are grouped together to form a Wheatstone bridge arrangement in which a first arm includes the variable resistance YR and a binding post for connection to the reference electrode YE; a second arm includes the fixed resistance R2; a third arm includes the variable resistance XR; and a fourth arm includes a binding post for connection to the electrode XE to be measured; the source of energy being connected at the junction of the first and second arms and at the junction of the third and fourth arms and the current detector being connected between the junction of the second and third arms and a binding post for connection to a third earth electrode, as PE, for making a connection to the junction of the fourth and first arms.

2. A meter for measuring the resistance of an earth electrode, which includes two variable resistances as XR and YR and a fixed resistance as R2 and a switch for combining the elements in two alternative relationships such that in the first relationship a portion of XR is contained in one arm of a Wheatstone bridge arrangement of which bridge R2 constitutes a second arm and a portion of YR constitutes a third arm; and in the second relationship the remaining portion of YR is included in one arm of a Wheatstone bridge arrangement in which bridge R2 constitutes a second arm and the remaining portion of XR constitutes a third arm; the total resistances of YR and XR being equal to each other and to R2.

3. A meter for measuring the resistance of an earth electrode, which includes two variable resistances, as XR and YR, and two fixed resistances as R2 and R3 and a switch for combining the elements in two alternative relationships such that in the first relationship a portion of XR is in series with R3, the two elements being contained in the same arm of a Wheatstone bridge arrangement of which bridge R2 constitutes a second arm and a portion of YR constitutes a third arm; and in the second relationship the remaining portion of YR is included in one arm of a Wheatstone bridge arrangement in which bridge R2 constitutes a second arm and the remaining portion of XR constitutes a third arm; the values of the resistances being such that R3 plus the total resistance of XR equals R2 and equals also the total resistance of YR.

4. A meter for measuring the resistance of an earth electrode, which includes two variable resistances as XR and YR and three fixed resistances as R1, R2 and R3, and a switch for combining the elements in two alternative relationships such that in the first relationship a portion of XR is in series with R3, the two elements being contained in the same arm of a Wheatstone bridge arrangement in which bridge R2 constitutes a second arm and a portion of YR constitutes a third arm; and in the second relationship the remaining portion of YR and R1 are included in one arm of a Wheatstone bridge arrangement in which bridge R2 constitutes a second arm and the remaining portion of XR constitutes a third arm; the values of the resistances being such that R3 plus the total resistance of XR equals R2 and equals also the total resistance of YR plus R1.

5. An electrical system for measuring the unknown value of the resistance of an earth electrode as XE; comprising a fixed resistance as R2, two variable resistances as YR and XR, a reference electrode as YE, a source of energy, a current detecting device as T and a probe electrode as PE and means for connecting the electrode XE and a portion of XR in one arm of a Wheatstone bridge, R2 as a second arm of the bridge, a portion of YR as a third arm of the bridge and electrode YE as the fourth arm of the bridge and means for connecting electrode YE and the remaining portion of YR as one arm of a Wheatstone bridge, R2 as a second arm of the bridge, the remaining portion of XR as the third arm of the bridge and the electrode XE as the fourth arm of the bridge; the sum of the two portions of YR being equal to the sum of the two portions of XR and equal also to R2.

6. A meter for measuring the resistance of an earth electrode in accordance with claim 1 characterized by the addition of a metal member attached to the bottom of the casing and resting upon the earth, said metal member being electrically connected in series with the detecting device and the earth and between the two.

In testimony whereof I affix my signature.

STEPHEN W. BORDEN.